July 26, 1966
H. A. PAGE ET AL
3,262,485
CONTROL OF FUEL AND AIR SUPPLY TO BURNERS
Filed Dec. 5, 1963
2 Sheets-Sheet 1
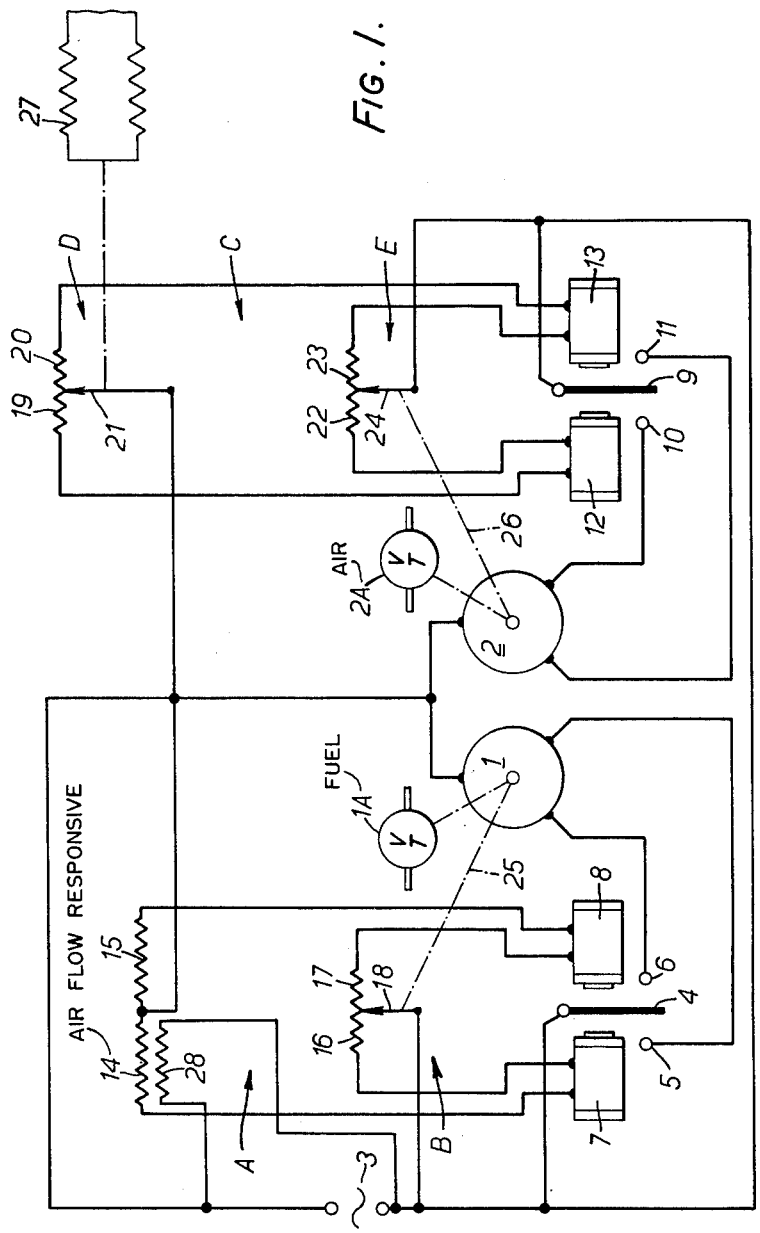
INVENTORS
HAROLD A. PAGE
ALEXANDER D.C. GUNN
BY Watson, Cole, Grindle & Watson
ATTORNEYS

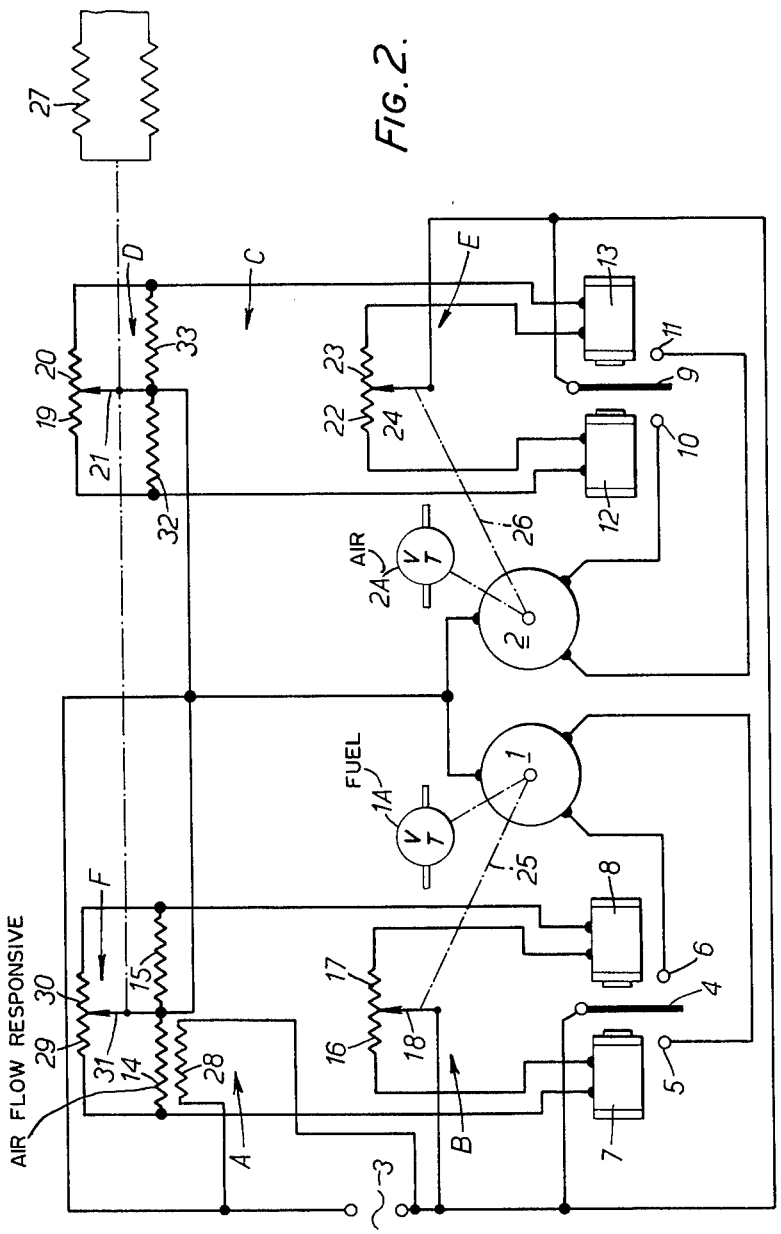

United States Patent Office 3,262,485
Patented July 26, 1966

3,262,485
CONTROL OF FUEL AND AIR SUPPLY TO BURNERS
Harold Arthur Page, Annan, and Alexander David Chalmers Gunn, Dumfries, Scotland, assignors to Cochran and Company, Annan, Limited, Annan, Scotland, a company of Great Britain
Filed Dec. 5, 1963, Ser. No. 328,407
Claim priority, application Great Britain, Dec. 6, 1962, 46,102/62
6 Claims. (Cl. 158—28)

This invention relates to apparatus for the control of the fuel and air supply to the oil or gas burners of combustion apparatus as used, for example, in steam generators and other types of plant, and it is an object of the invention to ensure that the mass flow rates of fuel and air to a burner are maintained approximately in the desired proportions, the term "air" being used herein for convenience to include air, oxygen, or oxygen-enriched air.

Apparatus for the control of the fuel and air supply to an oil or gas burner according to the present invention comprises main control means arranged to be operated manually and/or automatically in accordance with the output required of the plant with which the burner is associated, and auxiliary control means arranged to control the relative proportions of fuel and mass air flow passing to the burner and comprising an electrical bridge circuit one side of which includes a resistor which has a relatively high resistance-temperature coefficient and is arranged in the air stream to the burner so that its temperature is affected thereby, and a relay device associated with and responsive to changes in the condition of balance of the bridge circuit and arranged to control the operation of the auxiliary control means in a manner tending to maintain such relative proportions constant.

The auxiliary control means preferably includes valve apparatus arranged to be operated by a servo motor which is arranged to be brought into operation by the relay device, and for convenience hereinafter such apparatus will be referred to as a servo-operated valve.

The relay device may comprise, for example, differential electro-magnetic apparatus positioned in the bridge circuit so that departures from a determined state of balance of the bridge circuit in one sense or the other, due to some change in the condition of air flow and hence in the temperature of the resistor subject to the air flow, cause an armature associated with the differential electro-magnetic apparatus to move selectively from an equilibrium position in one direction or the other to close the appropriate one of two electric circuits and thus cause the servo-operated valve to be moved in the appropriate direction to restore the fuel and mass air flow to the desired proportions, and simultaneously to restore the bridge circuit to the determined condition of balance.

In some forms of the invention a single bridge circuit may be provided including a resistor arranged in the air stream so that its temperature varies with variations in the rate of mass air flow, in which case the resistance will be continuously heated so that its temperature changes with changes in the rate of mass air flow, assuming the temperature of the air to remain approximately constant, while in other forms of the invention the resistor may be unheated and thus be subject to changes in temperature due solely to changes in the temperature of the air flowing to the burner.

In still further examples of the invention the apparatus may comprise a compound bridge circuit or two bridge circuits embodying resistors, one of which is arranged to be continuously heated and lies in the air stream so that its temperature varies with variations in the rate of mass air flow, the change in the balance of its associated bridge circuit thus caused being arranged to effect the desired control of the air or fuel supply to maintain the portions of fuel and mass air flow correct, while the other is arranged to be subject to heated air delivered to the burner but is otherwise unheated so that its temperature depends solely upon the temperature of the heated air, the effect on the balance of the associated bridge circuit with changes in the resistance of this latter resistor causing control of the fuel or air supply to maintain the correct proportion between fuel supply and mass air flow in spite of changes in the temperature of the air flow to the burner. In any case where apparatus according to the invention includes a permanently heated resistor arranged in the air stream so that its temperature varies with variations in the rate of mass air flow, the associated bridge circuit conveniently also includes an unheated resistance subject to the air temperature so that the balance of the bridge circuit is only influenced by changes in the rate of air flow and not in changes in the air temperature.

Since normally a bridge circuit comprises four arms each including a resistive element, the term "arm" will hereinafter be used to refer to the resistive element in each arm.

Two examples of apparatus according to the invention suitable for application to the combustion apparatus of a steam boiler are illustrated diagrammatically in the accompanying drawings, in which FIGURE 1 is a diagram showing one form of the invention, and FIGURE 2 is a similar view to FIGURE 1 showing the second form of the invention.

In the form of the invention shown in FIGURE 1 the reference numerals 1 and 2 indicate two reversible electric motors arranged to control respectively valve apparatus controlling the fuel flow to the burner of a steam boiler and a valve controlling the combustion air flow to the burner. Since the valve apparatus controlling the fuel flow to the burner and the valve controlling air flow to the burner may both be of known types, while the mechanism by which the necessary control of the valve apparatus and valve is effected respectively by the two motors 1 and 2 may be of known type and in itself forms no part of the present invention, this apparatus is not shown.

In the drawings 3 represents a source of alternating current electric supply by which the motors are operated when required.

The motor 1 is arranged to be controlled by a solenoid-operated switch comprising a central movable contact 4 and two fixed contacts 5 and 6, the contact 4 being arranged to be actuated by a differential relay comprising two solenoids 7, 8 acting thereon in opposite directions, and the arrangement being such that movement of the contact 4 in one direction or the other from its central neutral position shown brings the electric motor 1 into operation in one direction or the other respectively to increase or to reduce the rate of fuel delivery. Similarly the motor 2 is arranged to be controlled by a relay switch comprising a movable contact 9 and two fixed contacts 10, 11 the movable contact 9 being arranged to be actuated by a differential relay comprising two solenoids 12, 13 acting thereon in opposite directions, the arrangement being such that movement of the contact 9 in one direction or the other brings the electric motor 2 into operation in one direction or the other to open or close the air valve. The solenoids 7 and 8 are arranged in opposite sides of a bridge circuit generally indicated at A, the four arms of which are constituted respectively by the resistors 14 and 15, and by the parts 16, 17 of a potentiometer B which lie respectively on the two sides of the movable contact 18 of the potentiometer.

The solenoids 12 and 13 are arranged in the two sides of a bridge circuit C the four arms of which are constituted respectively by the parts 19 and 20 of a potentiometer D lying on opposite sides of the movable contact 21 of the potentiometer D and by the parts 22, 23 of a potentiometer E lying on opposite sides of the movable contact 24 of the potentiometer E.

The movable contacts 18 and 24 are mechanically connected respectively to the electric motors 1 and 2 by connections diagrammatically shown at 25 and 26 so as to be moved thereby in a manner hereinafter described, while the movable contact 21 is arranged to be moved by a device, indicated at 27, responsive to the pressure or temperature of the steam in the boiler with which the apparatus is associated.

It will be apparent that when the bridge circuit A or C is balanced the two solenoids 7 and 8 or 12 and 13 counterbalance one another so that the contacts 4 or 9 occupy their central neutral positons as shown. If either of the bridge circuits A and C becomes unbalanced, however, the movable contact 4 or 9 as the case may be, is moved in one direction or the other so as to bring into operation the appropriate motor 1 or 2 in the appropriate direction to adjust the fuel or air supply in the required sense, and simultaneously to move the movable contact 18 or 24, as the case may be, in such direction as to restore the balance of the bridge circuit when the appropriate adjustment of the fuel or air supply has been made, whereupon the contact 4 or 9 returns to its central neutral position.

The resistor 14 is arranged in the air stream to the boiler and is permanently heated in a manner known per se, as by being in close proximity to an electric heater coil, indicated at 28 while the resistor 15 is unheated but is subject to ambient air temperature, the arrangement being such that the bridge circuit A is in balance when the resistor 14 has some predetermined temperature substantially above atmospheric temperature.

In operation, assuming the two bridge circuits to be in a state of balance, if a change in steam pressure or temperature occurs, the device 27 moves the contact 21 of the potentiometer D and thus unbalances the bridge circuit C in such manner as to cause the contact 9 to be moved to bring the motor 2 into operation in the appropriate direction to open or close the air valve 2A. The change in the rate of mass air flow thus caused causes a change in temperature and hence the resistance of the resistor 14 and thus unbalances the bridge circuit A thus causing movement of the contact 4 to bring the motor 1 into operation to adjust the valve 1A and hence the rate of fuel supply to conform to the new rate of air flow. The motors 1 and 2 when effecting these adjustments also adjust the contacts 18 and 24 in such manner that the bridge circuits A and C are rebalanced and the motors therefore cut off by the contacts 4 and 9 reassuming their neutral positions when the appropriate adjustments of fuel and air flow have been effected.

If, moreover, during operation of the boiler there is a change in the rate of mass airflow due to some cause other than control by the motor 1 e.g. due to a change in atmospheric conditions so that the temperature of the resistor 14 changes this will upset the balance of the bridge circuit A and thereby cause the contact 4 to be moved to bring the motor 1 into operation in such manner as to apply a correction to the rate of fuel supply tending to maintain the correct proportion between the rate of mass air flow and the rate of fuel supply.

Thus, not only is the apparatus under the control of the device 25 in such manner as to increase and reduce substantially simultaneously the rate of mass air flow and the rate of fuel supply in accordance with the demands of the boiler, but the bridge circuit A with its associated relay switch 4, 5, 6 acts to control the operation of the motor 1 in such manner as to adjust the rate of fuel supply in accordance with changes in the rate of mass air flow which may occur other than as a result of any action of the device 25.

In the alternative arrangement shown in FIGURE 2 the apparatus is generally similar to that shown in FIGURE 1 (and equivalent parts have therefore been given the same reference numerals) except that in addition to the resistors 14 and 15 in the bridge circuit A there is a potentiometer F the parts 29, 30 of which lying respectively on the two sides of its movable contact 31 are in parallel respectively with the resistors 14 and 15, the movable contact 31 is mechanically linked to the movable contact 21, and resistors 32 and 33 are arranged in parallel respectively with the parts 19 and 20 of the potentiometer D. The resistor 32 is unheated and lies in the heated air stream to the burner so as to be responsive to changes in the temperature of that stream while the resistor 33 is an unheated balancing resistor of low or negligible resistance-temperature coefficient.

In this arrangement any movement of the device 27 due to a change in steam pressure or temperature causes simultaneous movement of the movable contacts 21 and 31 to unbalance the bridge circuits A and C and thereby cause the contacts 4 and 9 to move to bring the motors 1 and 2 into operation in the appropriate direction to cause a proportional simultaneous increase or decrease in the rates of fuel and air supply by the valves 1A and 2A. As in the arrangement shown in FIGURE 1 changes in mass air flow resulting in changes in the temperature and hence the resistance of the resistor 14 act, by altering the condition of balance of the bridge circuit A and hence causing appropriate movement of the contact 4 to cause operation of the motor 1 to adjust the rate of fuel supply by the valve 1A in a manner tending, for any setting of the device 25 to maintain the relative rates of fuel supply and air flow constant, while variations in the resistance of the resistor 32 due to changes in the temperature of the heated air delivered to the burner act, by altering the condition of balance of the bridge circuit C and hence causing appropriate movement of the contact 9, to cause operation of the motor 2 to adjust the air valve 2A in a manner tending to maintain the rate of mass air flow constant, that is to increase the velocity of air flow if the air temperature rises and vice versa.

In a modified arrangement according to the invention otherwise similar to that shown in FIGURE 2 the resistors 32 and 33 might be omitted so that only the adjustments due to changes in the temperature of the resistor 14 would be provided while in another similar modification of the arrangement shown in FIGURE 2 the resistors 14 and 15 might be omitted so that only the adjustments due to changes in the temperature of the resistor 32 would be provided for.

What we claim as our invention and desire to secure by Letters Patent is:

1. Apparatus for the control of fuel and air supply to an oil or gas burner comprising delivery means for delivering fuel and air to the burner, a first control means operable to vary the rate of delivery of said fuel and air in the same sense, in accordance with the output required of the part with which the burner is associated, and a second control means comprising at least one electrical bridge circuit including a resistor of relatively high resistance temperature co-efficient located in one side of said bridge circuit and disposed in the air stream to the burner so that its temperature is affected thereby, a relay device associated with and responsive to changes in the condition of balance of said bridge circuit, a third control means controlled by said relay device and controlling the relationship between the rate of fuel supply and air supply to the burner, said second control means including valve apparatus controlling the air supply to the burner and a servo motor actuating said valve apparatus and controlled by said relay device, said relay device comprising differential electromagnetic apparatus arranged in the bridge circuit and including an armature whereby changes in the state of balance of the bridge circuit in one sense or the other with changes in the condition of air flow and hence the temperature of the resistor subject to the air flow cause said armature to move selectively from an equilibrium position in one direction or the other to close the appropriate one of two electric circuits and thus cause operation of the second control means in one sense or the other to restore the fuel and mass air flow to the desired proportions, a potentiometer in said bridge circuit and an interconnection between said potentiometer and said second control means to restore the bridge circuit to the determined condition of balance simultaneously with operation of said second control means to restore the fuel and mass air flow to the desired proportions.

2. Apparatus for the control of the fuel and air supply to an oil or gas burner as claimed in claim 1 in which the relay device comprises differential electro-magnetic apparatus arranged in the bridge circuit and including an armature whereby changes in the state of balance of the bridge circuit in one sense or the other with changes in the condition of air flow and hence in the temperature of the resistor subject to the air flow cause said armature to move selectively from an equilibrium position in one direction or the other to close the appropriate one of two electric circuits and thus cause operation of the auxiliary control means in one sense or the other to restore the fuel and mass air flow to the desired proportions and a potentiometer in said bridge circuit and an interconnection between said potentiometer and said control means to restore the bridge circuit to the determined condition of balance simultaneously with operation of the auxiliary control means to restore the fuel and mass air flow to the desired proportions.

3. Apparatus for the control of the fuel and air supply to an oil or gas burner as claimed in claim 2 including heating means continuously heating said resistor of relatively high resistance-temperature coefficient.

4. Apparatus for the control of the fuel and air supply to an oil or gas burner comprising electric motors controlling respectively the fuel and air supply to the burner, two bridge circuits one side of one at least of which includes a resistor which has a relatively high resistance-temperature coefficient and is arranged in the air stream to the burner, a relay device associated with and responsive to changes in the condition of balance of each bridge circuit, the relay device associated with one bridge circuit controlling the operation of the electric motor controlling the fuel supply to the burner while that associated with the other bridge circuit controls the electric motor controlling the air supply to the burner, the disposition of the resistor of relatively high resistance-temperature coefficient in its associated bridge circuit being such that changes in the state of balance of that bridge circuit caused by a change of temperature of the resistor cause operation of the associated relay in a sense to maintain a predetermined proportion between the fuel and air supply, and main control means operable in accordance with the heat output required of the plant with which the burner is associated, said main control means comprising a potentiometer disposed in the bridge circuit associated with the control of air supply to the burner, further potentiometers disposed respectively in said bridge circuits to control the state of balance of that bridge circuit, and an operative connection between each of said further potentiometers and the electric motor associated with its bridge circuit to restore the state of balance of said bridge circuit as said motor restores the air and fuel supply to the desired proportions.

5. Apparatus for the control of the fuel and air supply to an oil or gas burner as claimed in claim 4, in which each bridge circuit includes a potentiometer operated by the main control apparatus in addition to the associated potentiometer operated by the operation of the appropriate electric motor.

6. Apparatus for the control of the fuel and air supply to an oil or gas burner as claimed in claim 5 in which a heating device is provided for the resistor of relatively high resistance-temperature coefficient in one bridge circuit the resistor in the other bridge circuit is unheated.

References Cited by the Examiner
UNITED STATES PATENTS

| | | | |
|---|---|---|---|
| 2,143,820 | 1/1939 | Payn. | |
| 2,208,762 | 7/1940 | Hartig et al. | 236—78 |
| 2,393,708 | 1/1946 | Reichel | 158—1 X |
| 2,451,459 | 10/1948 | Williams | 158—28 |

JAMES W. WESTHAVER, Primary Examiner.